United States Patent
Tepesch

(10) Patent No.: US 8,091,337 B2
(45) Date of Patent: Jan. 10, 2012

(54) EXHAUST TREATMENT DEVICE HAVING A REACTIVE COMPOUND AND CONDITIONING THE DEVICE VIA ENDOTHERMIC REACTION

(75) Inventor: Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 906 days.

(21) Appl. No.: 12/074,142

(22) Filed: Feb. 29, 2008

(65) Prior Publication Data

US 2009/0217648 A1 Sep. 3, 2009

(51) Int. Cl.
*F01N 3/00* (2006.01)
(52) U.S. Cl. ............... 60/274; 60/286; 60/295; 60/299; 60/300; 60/311
(58) Field of Classification Search .................... 60/274, 60/276, 286, 299, 300, 295, 311
See application file for complete search history.

(56) References Cited

U.S. PATENT DOCUMENTS

| | | | | |
|---|---|---|---|---|
| 4,230,072 A * | 10/1980 | Noguchi et al. | ............ | 123/1 A |
| 5,827,496 A | 10/1998 | Lyon | | |
| 6,322,605 B1 | 11/2001 | He et al. | ......................... | 55/523 |
| 6,413,895 B1 | 7/2002 | Merkel | ........................ | 501/134 |
| 6,631,612 B1 | 10/2003 | Setoguchi et al. | ............. | 60/295 |
| 6,698,190 B2 * | 3/2004 | Docter et al. | .................. | 60/285 |
| 6,736,875 B2 | 5/2004 | Gadkaree et al. | ............. | 55/523 |
| 6,951,099 B2 | 10/2005 | Dickau | .......................... | 60/300 |
| 7,131,264 B2 * | 11/2006 | Weissman et al. | ............. | 60/286 |
| 7,179,430 B1 | 2/2007 | Stobbe et al. | ................. | 422/180 |
| 7,246,485 B2 | 7/2007 | Ohki et al. | ..................... | 60/285 |
| 7,297,656 B2 | 11/2007 | Zhang et al. | .................. | 502/339 |
| 7,314,847 B1 | 1/2008 | Siriwardane | ................. | 502/400 |
| 7,430,875 B2 * | 10/2008 | Sasaki et al. | ................. | 62/238.2 |
| 7,735,313 B2 * | 6/2010 | Osumi et al. | .................... | 60/285 |
| 7,770,386 B2 * | 8/2010 | Lowe et al. | .................... | 60/295 |
| 2002/0141910 A1 | 10/2002 | Adiletta | ........................ | 422/171 |
| 2005/0000211 A1 | 1/2005 | Fayard | ............................ | 60/295 |
| 2006/0153753 A1 | 7/2006 | Mauran et al. | | |
| 2006/0233687 A1 | 10/2006 | Hojlund Nielsen | ........... | 423/210 |
| 2007/0283681 A1 | 12/2007 | Makkee et al. | ................. | 60/274 |
| 2008/0000219 A1 | 1/2008 | Ratcliff et al. | ................. | 60/274 |
| 2008/0000221 A1 | 1/2008 | Silvis | ............................. | 60/286 |

FOREIGN PATENT DOCUMENTS

EP  1 775 010  4/2007

OTHER PUBLICATIONS

E. Koren et al., "Improving Cold-Start Functioning of Catalytic Converters by Using Phase-Change Materials", 1998 Socieity of Automotive Engineers, Inc., p. 43-50.

* cited by examiner

*Primary Examiner* — Binh Q Tran
(74) *Attorney, Agent, or Firm* — Joseph M. Homa; Matthew J. Mason

(57) ABSTRACT

An exhaust treatment device and a method of conditioning the device that include a reactive compound capable of undergoing an endothermic reaction are described. A method of manufacturing the device is also disclosed.

16 Claims, No Drawings

EXHAUST TREATMENT DEVICE HAVING A REACTIVE COMPOUND AND CONDITIONING THE DEVICE VIA ENDOTHERMIC REACTION

FIELD

The invention relates to an exhaust treatment device and a method of conditioning the device, such as a particulate filter and method of regenerating the filter.

BACKGROUND

Environmental standards restrict the level of particulates that can issue from exhaust streams. In diesel engines, particulates arise in the exhaust stream by processes including incomplete combustion and fuel contamination. A common particulate in a diesel engine exhaust stream is soot, which comprises elemental carbon. Filters can remove particulates from exhaust streams, but increasing levels of particulates trapped in the filters can increase back pressure and reduce engine efficiency. The clogged filter must be replaced with new filter or regenerated to remove substantially all particulates from the filter. For example, particulates consisting essentially of soot can be incinerated at elevated temperatures to form gaseous products.

SUMMARY

The present invention describes an exhaust treatment device, such as a particulate filter or an exhaust particulate filter, for example a diesel particulate filter, and a method of conditioning the device for example removing accumulated particulates from a particulate filter, i.e. regenerating, the filter. Preferably, the device and method help to reduce large temperature excursions during regeneration. The device can comprise a body which includes a reactive compound capable of undergoing an endothermic chemical reaction. The body can be comprised of porous material, such as a refractory material like porous ceramic, or nonporous material, such as metal. The body can comprise a matrix having a honeycomb structure or a foam structure. Embodiments of the exhaust treatment device can include filters, such as wall-flow filters, and catalytic supports or substrates, such as flow through substrates.

DETAILED DESCRIPTION

As disclosed herein, the exhaust treatment device comprises a body comprised of a base material, such as ceramic or metal, and a reactive compound. The base material provides a structural framework. The device can be, for example, a flow through substrate (catalyst support) or a wall flow particulate filter. Particulate filters can be used to remove particulate emissions from mobile sources, such as related to the exhaust streams of engines such as internal combustion engines, including but not limited to diesel engines, or from stationary sources, such as the exhaust streams of power plants. An exhaust stream can be made to pass through a particulate filter so that the filter captures particulates before the exhaust stream is released into the atmosphere. The filter can be made from a porous material, such as ceramic, which allows flow therethrough; however, the filter can become increasingly filled as particulates accumulate. The accumulation of particulates tends to restrict the flow of the exhaust stream, as evidenced by an increase in backpressure across the filter, and can reduce engine efficiency. At some point, the filter must be either replaced or regenerated, that is, conditioned to remove some or all of the accumulated particulates. Regeneration can include heating the filter to a temperature sufficient to volatize the particulates. Volatization can include oxidizing or reducing particulates. For example, carbon particulates, such as soot, can be oxidized.

Regeneration can be either passive or active. Passive regeneration occurs when the particulate filter becomes so filled with particulates that heat, which has accumulated in the exhaust system due to high back pressure, ignites the particulate and initiates an exothermic chemical reaction. The exothermic chemical reaction can include oxidation and volatization of the particulate. Active regeneration occurs when energy is supplied to the filter to initiate the exothermic chemical reaction. Energy can include, for example, electricity, fuel, or radiation. Passive and active regeneration can produce large temperature excursions as a result of the exothermic chemical reaction.

The particulate filter can be comprised of a refractory material such as temperature resistant metals and ceramics; these materials can also have a low coefficient of thermal expansion in order to mitigate the effects of an imposed thermal shock. Refractory ceramics can include silica, cordierite, alumina, zeolites, mullite, silicon carbide, silicon nitride, silicon/silicon carbide composites, aluminum titanate, and their combinations.

The device and method disclosed herein help to reduce large temperature excursions in the device, such as a filter during regeneration. The device includes a reactive compound. During regeneration, the exothermic chemical reaction of the particulate increases the temperature of the device, and the temperature can vary depending on a number of factors including, for example, the type of particulate, quantity of particulate, flow rate of the exhaust stream, size of the device, geometry of the device, and composition of the device. The reactive compound is capable of undergoing an endothermic chemical reaction above a selected regeneration temperature. The endothermic chemical reaction can absorb at least part of the heat generated from the exothermic chemical reaction, and consequently tends to reduce a surge in temperature associated with the exothermic chemical reaction, and therefore can help reduce thermal gradients in the filter. The endothermic chemical reaction can include, for example, a decomposition reaction. In some embodiments, the endothermic chemical reaction is reversible. In other embodiments, the endothermic chemical reaction is irreversible; such irreversible can be utilized as a one-time use heat absorber in the event of a runaway exothermic event. In one embodiment, the filter is a diesel particulate filter. The filter comprises a body comprised of a base material and a reactive compound. The reactive compound can be disposed within the body as, for example, a surface treatment on the surface of the body, a second solid phase of the base material (such as ceramic) of which the body is constituted, or as discrete particles that are attached to or otherwise lodged in or on the body.

Particulate filters include porous bodies capable of capturing particulates and allowing fluid to pass through. Porous bodies can include porous, cellular bodies such as, for example, honeycomb bodies. Capture can include directing the exhaust stream along a tortuous path, through a gas permeable wall, controlling porosity so that the expected particulates exceed the pore size, adsorption of particulates on the surface of the filter, and settling the particulates in a region where the exhaust stream has a low flow rate. To this end, particulate filters and flow-through substrates can be particularly effective.

The endothermic chemical reaction of the reactive compound will have adequate kinetics to absorb at least part of the excess heat created by the exothermic chemical reaction. The reactive compound can include any suitable element or chemical compound that undergoes an endothermic chemical reaction at a suitable reaction temperature which is above the maximum selected regeneration temperature. In some embodiments, the endothermic reaction occurs at a temperature, and removes sufficient heat, to prevent the further increase in temperature due to heat generated by the exothermic reaction. In other embodiments, the endothermic reaction occurs at a temperature above which the exothermic reaction becomes uncontrolled; such as when heat generated during regeneration exceeds heat loss by the particulate filter.

In use, diesel particulate filters can be subjected to an exhaust stream temperature between at temperatures greater than 200 C or greater than 300 C. Regeneration of a diesel particulate filter could desirably occur around 600 C in conditions where higher temperatures might increase the kinetics of regeneration and the amount of heat released to the filter, which can then further increase the temperature and the kinetics; for example, a run-away reaction might occur above about 700 C, say at 800 C, resulting in uncontrolled regeneration and consequent large temperature excursions, so that the reactive compound is selected such that the endothermic chemical reaction occurs between around 700 and 1000 C. The endothermic chemical reaction can help to moderate regeneration temperatures and reduce thermal gradients within the particulate filter. Advantageously, moderation of the regeneration temperature and decreasing thermal gradients can permit a lower thermal mass of the filter, that is, the filter can include less matter such as, for example, by having thinner walls.

The endothermic chemical reaction absorbs at least a part of the heat generated by the exothermic chemical reaction. The mass, or volume, of base material for a given matrix can be reduced by substitution with a smaller mass, or volume, of reactive compound. The ratio of the heat absorbed by the endothermic chemical (due to the presence of the reactive compound) plus the integral of the heat capacity of the structure comprising the base material plus reactive compound taken from 600° C. to 1100° C. divided by the integral of the heat capacity of the structure comprising the base material alone taken from 600° C. to 1100° C. is preferably greater than 2, in some embodiments greater than 3, in other embodiments greater than 5, and in still other embodiments greater than 10. A lower enthalpy of reaction could be used provided the particulate filter comprises a greater quantity of reactive compound. Similarly, a lesser amount of reactive compound could be used where the enthalpy of reaction is greater. The endothermic chemical reaction can include irreversible and reversible reactions. Reversible reactions permit, for example, multiple regeneration cycles of a particulate filter. The reverse reaction will be exothermic and should occur after regeneration. Conveniently, in particulate filters such as diesel particulate filters, the reverse reaction can decrease the fuel penalty associated with the heat needed to initiate regeneration of the filter.

An example of the endothermic chemical reaction includes decomposition. Preferably, the decomposition reaction absorbs greater than 1.0 kJ/g, more preferably greater than 1.25 kJ/kg, and even more preferably greater than 1.5 kJ/kg. Preferably, the decomposition reaction absorbs greater than 2 kJ/cc, more preferably greater than 3 kJ/cc, and even more preferably greater than 4 kJ/cc. The reactive compound can include metal salts, such as for example $CaCO_3$, $CaSO_4$, and $MgSO_4$, and metal salt hydrates. Metal salts can decompose into a plurality of products including a metal oxide and at least one gas. Advantageously, the gas and its latent heat can be expelled from the filter with the exhaust stream, thereby providing an additional path for heat loss or heat removal from the filter. The gas can include, for example, water vapor, oxygen, and oxides of carbon and sulfur such as CO, $CO_2$ and $SO_2$. Metal salt hydrates can decompose by first releasing water vapor and later separating into a metal oxide and a gas. A reactive compound comprising $CaCO_3$ is particularly effective at reducing large temperature excursions. In air, $CaCO_3$ begins to decompose into CaO and $CO_2$ at around 550 C, but in low oxygen, high $CO_2$ atmospheres such as found in an exhaust stream, the equilibrium shifts to higher temperatures of around 700 C to 800 C. Thus, for example, if regeneration exceeds about 600 C, a decomposition reaction begins to absorb excess heat; after regeneration, the temperature of the filter drops and the equilibrium shifts so that $CaCO_3$ is conveniently recovered from the CaO product and exhaust gas $CO_2$. The decomposition of $CaCO_3$ has a heat of reaction of about 1.6 kJ/g, or about 4.3 kJ/cc. The magnitude of the heat absorbed by such reactions are about two to five times greater, on a per unit mass basis or a per unit volume basis, than heat absorbed by phase change, for example, melting of $B2O3$ (0.35 kJ/g), melting of basalt (0.50 kJ/g), $SiO2$ solid-solid phase change (0.04 kJ/g), or $ZrO2$ solid-solid phase change (0.05 kJ/g).

In some embodiments, the exhaust treatment device is a particulate filter comprised of a porous body comprising a honeycomb structure which includes a reactive compound. The base material of the honeycomb structure provides a solid phase framework that provides structure to the particulate filter. The base material comprises a refractory material. The honeycomb structure comprises at least about 20 vol % base material. For example, the particulate filter can comprise a honeycomb structure comprising at least about 75 vol % cordierite (base material) and a remainder (about 25%) of the reactive compound.

The reactive compound can be loaded into the exhaust treatment device such as a particulate filter by, for example, embedding the reactive compound in the shaped body such as a honeycomb structure (e.g. co-extrusion of a batch containing the reactive compound along with base material precursors), fixing to the surface of the device such as the surface of a honeycomb structure, placing within the device (e.g. within the honeycomb structure), or a combination thereof. For embodiments with embedded reactive compound, the reactive compound can be co-extruded with the base material precursor mixture into a green body and the green body subsequently fired to produce the particulate filter. For embodiments with the reactive compound fixed to the surface of the honeycomb structure, the reactive compound can be deposited onto the green body or the fired body; the green body can be comprised of the base material precursor mixture, or a combination of the base material precursor mixture and other amounts of reactive compound. For embodiments with deposition of the reactive compound, deposition can include forming a washcoat comprising the reactive compound and applying the washcoat onto the body by, for example, immersion, coating, or spraying. The washcoat can include, for example, a solution, mixture, or suspension of the reactive compound in a suitable liquid. Placing the reactive compound within the matrix includes locating particles of the reactive compound onto the honeycomb structure, for example, by injecting particles comprising the reactive compound into the particulate filter; in some embodiments, at least some of the particles of reactive compound are larger than the average pore size of the particulate filter so that the particles become trapped in the honeycomb structure.

Regeneration of a particulate filter is started by an initiation process where the temperature of the filter is increased sufficiently to initiate oxidation or reduction of the particulate matter from an exhaust stream trapped by the filter. Suitable initiation processes include for example electric heating, injection of an accelerant, or irradiation. Electric heating includes induction heating and heating coils. Accelerants increase the temperature of the filter by igniting or causing existing materials to ignite. Accelerants can include an inflammable material, air, oxygen, and mixtures thereof. The inflammable material can include diesel fuel, gasoline, propane, or other fuel. Irradiation can include microwave radiation.

Following regeneration, the reactive compound can be recovered as the temperature of the particulate filter falls below the reaction temperature. Recovery of the reactive compound is particularly efficacious when the endothermic chemical reaction produces a gas product. Recovery can include bringing the gas to a partial pressure sufficient to reform the reactive compound. For example, a gas consisting essentially of $CO_2$ or water is readily provided in many exhaust streams. Other product gases, such as $SO_2$, can be introduced into the particulate filter as a separate stream from a reservoir, such as a pressurized gas tank.

EXAMPLE 1

Three particulate filters comprising a honeycomb structures comprised primarily of cordierite and weighing between approximately 130 and 140 grams were each placed in a metal can that conformed to the exterior dimensions of the filter, and the canned filter was loaded with a 2.2 g of soot. Each filter was equilibrated at 650 C in an atmosphere of 95% nitrogen and 5% $CO_2$. A first filter acted as a control. A second filter was loaded with 20 g of cordierite powder. A third filter was loaded with 20 g of a $CaCO_3$ powder. The cordierite and $CaCO_3$ had similar heat capacities. The three filters were then taken through identical regeneration cycles by initiating an exothermic chemical reaction of the soot. The first filter without $CaCO_3$ exhibited a maximum temperature excursion of 1140 C and a maximum thermal gradient of nearly 400 C/cm. The second filter with cordierite powder exhibited a maximum temperature excursion of about 1150 C. The third filter with $CaCO_3$ exhibited a maximum temperature excursion of 950 C and a maximum thermal gradient of only 180 C/cm. Decomposition of the $CaCO_3$ absorbed at least a portion of the heat generated by the exothermic chemical reaction, and significantly reduced the maximum temperature excursion and thermal gradient. The effect was not due to the additional mass of the $CaCO_3$ because the second filter showed a maximum temperature excursion similar to the control.

The disclosure has been described with reference to various specific embodiments and techniques. However, many variations and modifications are possible while remaining within the spirit and scope of the disclosure.

The invention claimed is:

1. A method of conditioning an exhaust treatment device exposed to an exhaust stream, the method comprising:
   contacting the device with the exhaust stream;
   initiating an exothermic chemical reaction within the device, thereby generating heat and causing passive or active regeneration to occur; and
   initiating an endothermic chemical reaction within the device during passive or active regeneration, wherein the endothermic chemical reaction absorbs at least part of the heat generated by the exothermic chemical reaction.

2. The method of claim 1 wherein the exothermic chemical reaction comprises reacting exhaust particulates trapped in the device, wherein the exhaust particulates were removed from the exhaust stream.

3. The method of claim 1 wherein the device is a particulate filter or a flow-through substrate.

4. The method of claim 1, wherein the heat from the exothermic chemical reaction initiates the endothermic chemical reaction.

5. The method of claim 1, wherein the endothermic chemical reaction has a heat of reaction of at least about 1.25 kJ/g or at least about 2 kJ/cc.

6. The method of claim 1, wherein the exhaust treatment device comprises a reactive compound is selected from a group consisting of $CaCO_3$, $CaSO_4$, $MgSO_4$, metal salt hydrates, and combinations thereof.

7. The method of claim 6, wherein the device is comprised of at least 20 vol % of the reactive compound.

8. The method of claim 1, wherein initiating the exothermic chemical reaction comprises releasing an accelerant into the exhaust stream.

9. The method of claim 1 wherein the endothermic chemical reaction is reversible.

10. The method of claim 1, wherein the endothermic chemical reaction comprises decomposing the reactive compound into a plurality of products.

11. The method of claim 10, wherein at least one product includes a gas selected from a group consisting of CO, $CO_2$, $SO_2$, $H_2O$, $O_2$ and mixtures thereof.

12. The method of claim 10, further comprising recovering at least part of the reactive compound from the plurality of products.

13. The method of claim 1, wherein the endothermic chemical reaction is irreversible.

14. The method of claim 1, wherein the endothermic chemical reaction occurs between about 700 and 1000° C.

15. The method of claim 1, wherein the ratio of the heat absorbed by the endothermic chemical reaction plus the integral of the heat capacity of the device taken from 600° C. to 1000° C. divided by the integral of the heat capacity of the device taken from 600° C. to 1000° C. is greater than 2.

16. The method of claim 9, wherein the reverse reaction occurs after regeneration.

* * * * *